United States Patent [19]

Boyd et al.

[11] 3,848,197

[45] Nov. 12, 1974

[54] BOOST-SURGE POWER SUPPLY

[75] Inventors: Bruce Boyd, Ellicott City; Peter G. Espersen, Glen Burnie; Lewis S. Heyser, Sr., Linthicum, all of Md.

[73] Assignee: The United States of America as represented by the Secretary of the Air Force, Washington, D.C.

[22] Filed: Apr. 9, 1973

[21] Appl. No.: 349,903

[52] U.S. Cl. .................................. 330/44, 330/199
[51] Int. Cl. ............................................. H03f 3/54
[58] Field of Search .............. 330/44, 199, 202, 203

[56] References Cited
UNITED STATES PATENTS

| 3,259,855 | 7/1966 | Massey | 330/44 X |
|---|---|---|---|
| 3,596,196 | 7/1971 | Riley | 330/199 X |
| 3,673,511 | 6/1972 | Bickert | 330/44 |

*Primary Examiner*—Nathan Kaufman
*Attorney, Agent, or Firm*—Harry A. Herbert, Jr.; Robert Kern Duncan

[57] ABSTRACT

In a power supply system for a high voltage klystron tube amplifier the additional energy required to maintain the body-cathode voltage relatively constant is provided by a surge pass tube, with a relatively simple boost power supply, cooperating with a single high voltage supply. Regulation of the body-cathode voltage is obtained to the relatively inconsequential detriment of the regulation of the body-collector voltage.

1 Claim, 4 Drawing Figures

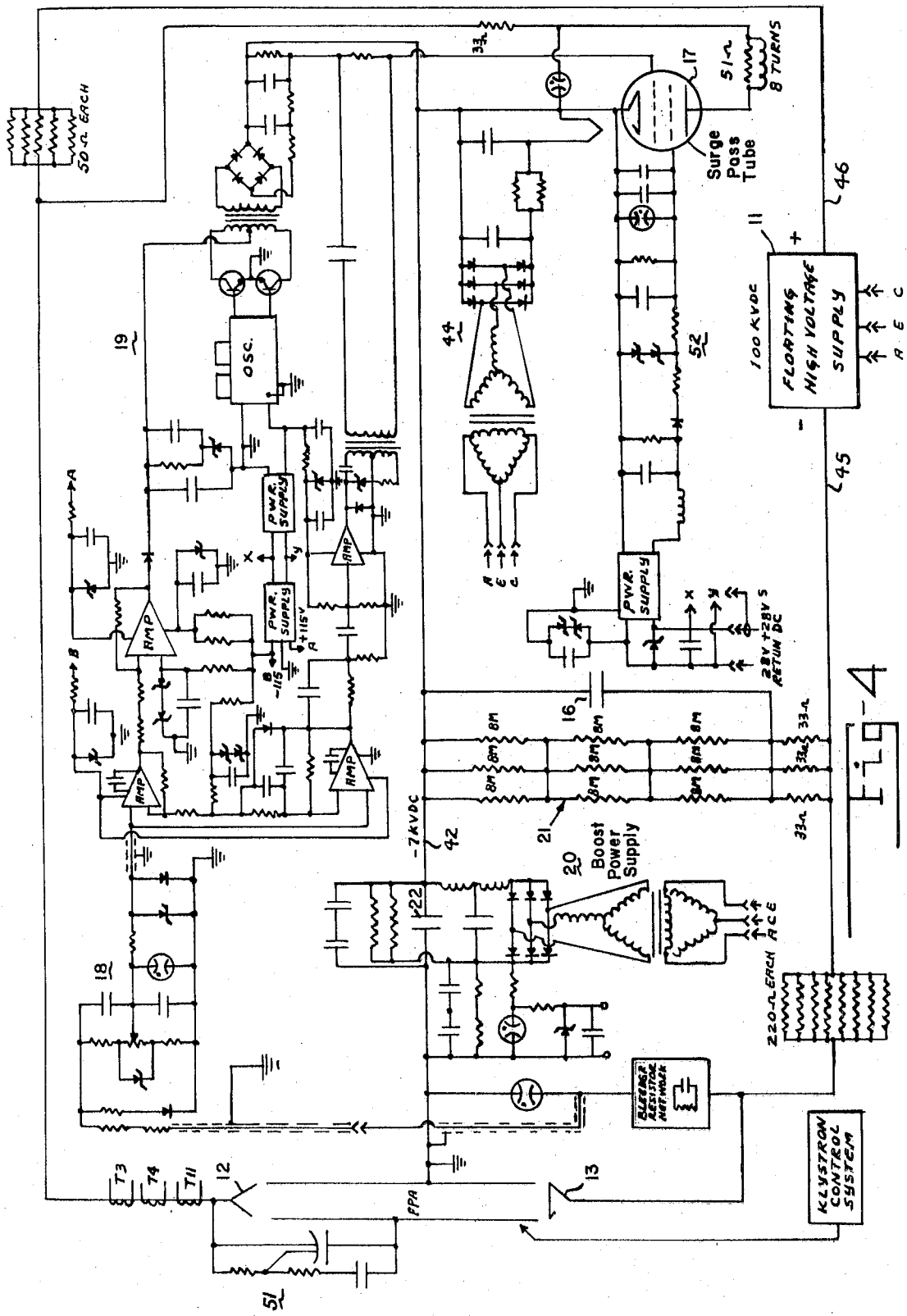

BOOST-SURGE POWER SUPPLY

BACKGROUND OF THE INVENTION

The field of the invention is in voltage supplies for traveling wave tube amplifiers and klystron tube amplifiers.

Prior art power supplies for these applications have generally had a highly regulated body power supply and an unregulated, or partially regulated, collector power supply. A typical body power supply consists of three-phase, high voltage insolation-transformers, rectifiers, filter chokes, filter capacitors and a large heavy pulse capacitor to limit the voltage droop at the tube during pulse-time. Two separate power supplies are conventionally used to save weight, because the body power supply requires high voltage ripple reduction and small pulse currents, while the collector power supply requires less ripple reduction and high pulse currents. It is the inherent nature of TWT's and klystrons that their desired characteristics are obtained with less regulation on their collector connection than on their body connection.

For pulse-composites of repetitive, equivalent pulses locked at a constant p.r.f. (pulse repetition frequency), the body and collector filter capacitor banks of conventional prior art power supplies, are partially discharged and recharged with a relatively large L-C time constant which is not detrimental since the body and collector voltages return to their former level before each pulse. However, the conventional power supply is inadequate in that it does not provide for operation with a composite of pulses with varying width, or equivalent pulses with a multiple p.r.f. Amplitude modulation occurs because the conventional power supply cannot recharge to a constant level with these types of pulse-composites. In addition to the modulation, sidebands, detrimental to high resolution applications, are produced due to the varying charging rate of the conventional supply causing a droop or slope in the current pulses through the final power amplifier tube.

SUMMARY OF THE INVENTION

An improved power supply particularly for large airborne transmitters having traveling wave tube or klystron final power amplifiers is disclosed. A single supply similar to the conventional typical collector power supply replaces both the previous collector supply and the body supply with the body drawing its energy requirements from the collector supply through a series regulator pass-tube. The pass-tube arrangement eliminates the body supply and its associated transformers, rectifiers, chokes and filter capacitors providing a much lighter weight supply than previously available. The disclosed power supply system provides greatly superior operating characteristics over previous practical system resulting in improved transmitter efficiency and providing transmitter operation with "critical" pulse composites that had not been heretofore feasible to use.

BRIEF DESCRIPTION OF THE DRAWING

FIG. 4 is a detailed schematic drawing of an embodiment of the invention.

DESCRIPTION OF THE PREFERRED EMBODIMENT

Figure 1:
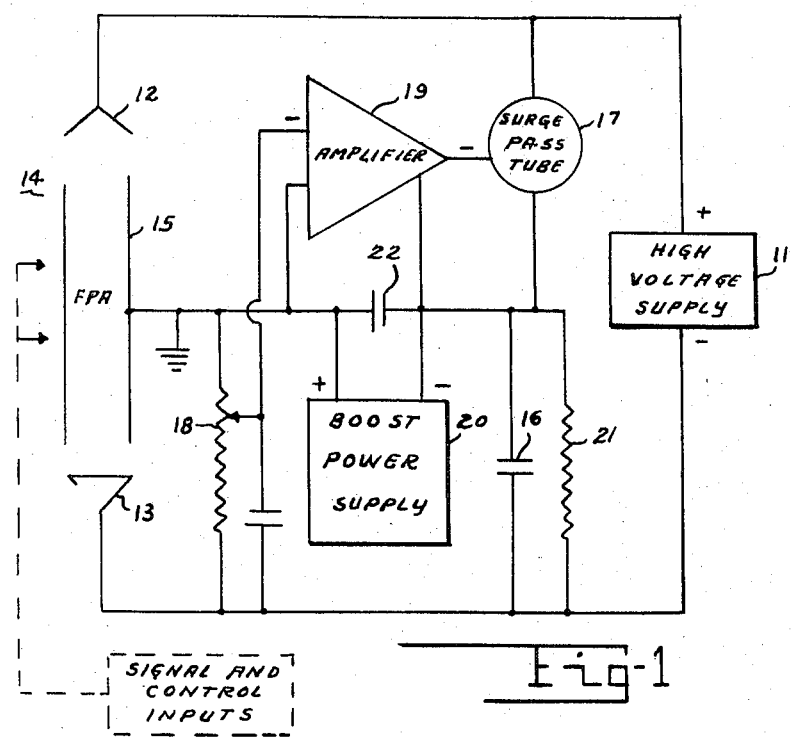
FIG. 1 is a simplified block-schematic diagram of an embodiment of the invention.

Referring to FIG. 1, the supply 11 has the conventional collector L-C time constant. With this invention this is not a disadvantage since collector-cathode voltage variations (that is, voltage variations between the collector 12 and the cathode 13 of the final power amplifier (FPA) 14) have an insignificant effect on phase shift, amplitude modulation, and sideband level of the output of the FPA. The body voltage, i.e., the voltage between the FPA body 15 and the cathode 13 is stabilized and the limitations of providing a practical L-C time constant in the power supply 11 are overcome by having the body capacitor 16 able to recharge very rapidly through the surge pass tube 17.

The body voltage is sensed at the voltage divider 18, amplified by the amplifier 19, and applied as a control signal to the control grid of the pass tube 17. The noise (voltage variation) across resistor 18 is produced by the voltage ripple on the main power supply 11 and the voltage ripple on the boost power supply 20. Bleeder resistor 21 across body capacitor 16 determines the minimum current passing through the pass-tube to insure stable operation. Capacitor 22, across the boost power supply voltage is much larger (over 10 times) in capacitance than the body capacity 16. It is required for proper operation of the system that capacitor 16 be able to charge and discharge faster than capacitor 22. Therefore, the R-C combination (21-16) must have a smaller time constant than the recharge time constant associated with capacitor 22.

The collector voltage will normally droop more than the body voltage during pulse time. (It is to be observed that the actual potential of the body is at ground potential and that the voltages referred to are measured to the body, i.e., ground. It is customary to speak of the potential between the cathode and the body as the body voltage and the collector voltage as that voltage between the collector and ground potential.) In typical embodiments where the body and collector voltages are initially equal, a boost power supply 20 is necessary to keep the pass tube in conduction. The boost power supply voltage is made slightly greater in magnitude than the maximum pulse-time droop of the collector voltage so as to maintain a forward bias on the pass-tube. (That is, the plate of the pass-tube positive with respect to its cathode.) Passive filtering is necessary in the boost power supply, but since the pass-tube provides additional active regulation in maintaining a substantially constant voltage across resistance 18, the filtering is not critical. When the FPA tube is pulsed, the tube's collector voltage droops below the body voltage because of the larger collector current. This depressed collector operation increases the tube's efficiency and allows for a reduction in the capacity of the storage capacity in the high voltage power supply for maintaining operating voltage during pulses. For some types of TWT's and klystrons the collector voltage is specified as having to be positive with respect to the body connection. In these particular embodiments where the collector voltage is always greater than the body voltage the boost power supply is unnecessary since the pass tube is always properly biased (including pulse-time). (That is, the plate of the pass tube is positive with respect to its cathode.) Without the boost power supply the gain of amplifier 19 may be reduced and voltage isolation in the amplifier is unnecessary. Generally, since it increases efficiency, it is more typical to depress the collector with respect to the body connection, which would thereby reverse bias (cut-off) the pass-tube without the boost-power supply which provides for the pass tube to be forward biased (in conduction) under this "depressed" condition. (Those practicing this invention will readily modify it within the principles herein disclosed to suit particular applications involving various requirements of the particular FPA used.)

The surge pass tube 17 should have high voltage stand-off properties, high plate resistance, and high voltage gain. The pass tube must be able to hold off the voltage of the boost power supply plus any voltage transients caused by turn-on, or changes in the duty of the pulse composite. A hold-off voltage capability of approximately one-third, or greater, of the body-cathode voltage has been found to be generally a satisfactory value. Tetrode or pentode type tubes are generally to be preferred for the pass tube due to their high plate resistances and high gain providing improved ripple reduction.

The response, or recovery, of the body voltage is determined by how hard and how soon, with regard to a pulse, that the pass tube is turned on. In particular embodiments of the invention, a conventional finite adjustable delay may be introduced in the response of amplifier 19 so that the boost-surge power supply can be adjusted to provide for short or pulse doppler pulses to be transmitted without reducing the series isolation-resistance presented by the pass tube between the effective collector voltage source and the body capacitor.

Figure 2:
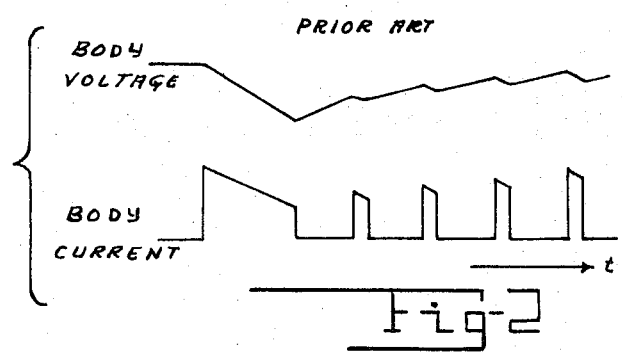
FIG. 2 is a graphical representation of typical operational characteristics of prior art power supply systems.
Figure 3:
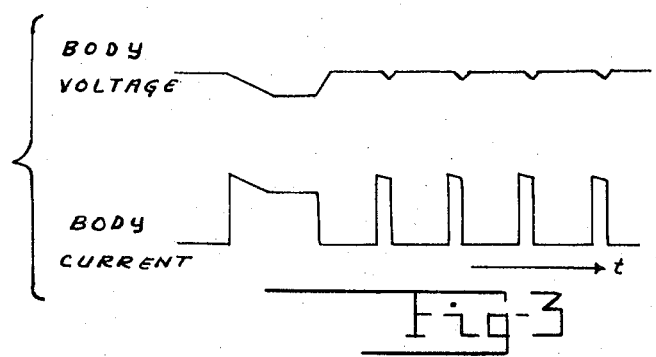
FIG. 3 is a graphical representation of typical operational characteristics of an embodiment of the disclosed power supply system.

For long transmitted pulse systems the pass tube may pass a variable amount of current during pulse time and/or, after pulse time. FIG. 3 shows the effect of the pass tube turning on during pulse time and reducing the droop on the long pulse as compared to the droop in the long pulse of prior art power supply systmes as shown in FIG. 2. FIG. 3 also shows the uniformity of the short pulses provided by this invention as compared to the characteristics of the prior art devices as shown in FIG. 2.

A specific operating embodiment of the invention used with a klystron FPA is shown schematically in FIG. 4. The complete details of the FPA, such as the driver, the grid pulser, the ion pump, etc., are well known and therefore not shown in the diagram. The invention relates to a power supply system for conventional FPA's which increases the efficiency of the FPA and decreases the weight of the power supply for the FPA as compared to the prior art power supplies. In this particular embodiment shown in detail in FIG. 4 the lowest p.r.f. to be transmitted is about 80Hz. The L-C resonant frequency of the power supplies, i.e., the high voltage supply 11, the boost supply 20, and the screen voltage supply 52, are approximately 20Hz. This separation prevents the systems pulsed load (FPA) from resonating any of the power supplies and possibly sending transients back to the prime power source. The boost power supply 20 is a −7KVDC supply. That is, its positive terminal is at ground potential and its negative terminal places −7KVDC on line 42. The "floating" high voltage supply 11 is approximately a 100KVDC supply. It, like the boost supply 20 and the surge pass tube filament supply 44 are all energized from the conventional three phase prime power line A, E, C. (The screen supply for the pass tube is energized from the 28 volt DC prime power line.) Representative potentials to ground on lines 45 and 46 are approximately −90KVDC and up to approximately ±7KVDC, respectively. The value of body capacitor 16 is approximately 0.2 $\mu$7 and that of storage 22 is 4.0 $\mu$. The voltage on the cathode 13 of the FPA is substantially a fixed DC voltage. However, an AC voltage component is produced during pulse-time, because of the large pulse currents involved. The regulator (as provided by the system) will recharge capacitance 16 with each pulse so that the cathode voltage is at a fixed voltage before each successive pulse.

The bandwidth of the amplifier 19 is approximately 0Hz to 7KHz. Thus, it will adequately take care of the major noise components to be regulated which originate from the three phase 400Hz prime source, which produces 400Hz, 1,200Hz, 2,400Hz, etc., components. The higher frequency noise components, beyond the range of 7KHz will be adequately filtered by the conventional filtering in the power supplies.

The tetrode surge pass tube 17 in this particular embodiment is a type A2964 (RCA). It can stand off one-third of the cathode potential, has a relatively high gain, and a high plate resistance. In addition it and the FPA are further protected by the triggered gap curcuit 51 in the event of an arc or crowbar. The boost supply 20 is used to depress the pass tube's (17) cathode, as previously mentioned. This forward biases the pass tube should the FPA collector voltage go negative with respect to the body of the FPA. The boost power supply 20 is a relatively small, low power, low voltage conventional power supply. Most of the energy dissipated between the FPA's body-cathode connection is diverted from the large, high power, high voltage main power supply 11 through the surge pass tube 17. The pass tube 17 regulates the voltage and recharges the body capacitor 16. The harder the pass tube 17 is turned on (by a decrease in magnitude of the negative potential of the cathode of the FPA), the more recharge current that is "pumped" into body capacitor 16 and the faster it will recover its proper voltage. Thus, the body voltage's recovery time is a function of the total charge passed through the pass tube or how hard it is turned on. It is to be observed that substantially the surge pass tube's plate is connected to the positive potential of the high voltage supply 11, its cathode is connected to one side of the body capacitor 16, and the other side of the body capacitor is substantially connected to the negative potential of the high voltage supply 11. With this serially connected relationship of the pass tube and body capacitor it may readily be seen that the signal applied to the control grid of the pass tube will control the current flowing in to the body capacitor and hence its charge potential. With substantially a fixed potential across capacitor 22, the body-cathode potential is regulated to substantially a constant voltage by the pass tube replacing the charge on the body capacitor as it tends to droop with pulse currents.

In most applications the potential on the collector 12 of the FPA does go below ground potential. Also, the collector pulse current is about ten times higher than the body pulse current. The effective capacities seen at the body-cathode connections and at the collector-cathode connections are about the same magnitude. Therefore, during pulse-time, the collector-cathode connection will experience a dropp in voltage about ten times as large as that seen on the body-cathode connection. This makes the collector drop below ground potential during pulse time. (However, the pass tube is still forward biased due to the boost power supply.)

In the particular embodiment being described and as shown in FIG. 4 with the previously mentioned 7KHz bandwidth, the amplifier cannot react to pulses shorter than approximately 1 $\mu$ sec as shown by the slight droop in the tops of the short pulses of FIG. 3. It can react to longer pulses so the system provides the improvement in long pulses shown in the figure. It is to be observed that the short pulses however are constant in amplitude and do not have the varying amplitude of the prior art devices as shown in FIG. 2.

Those skilled in the art will readily observe that regulation action of the apparatus "forces" the noise components from the main power supply onto the collector connection. The regulation on the body-collector connection is relaxed to improve the regulation on the body-cathode connection. This is entirely feasible in that in practically all TWT and klystron applications the collector is much less sensitive to voltage variations than the cathode. This system thus provides a new and entirely satisfactory power supply system for TWT's and klystrons that is much lighter in weight and economical than previous power supplies. The improvement in weight is such that an airborne system is now provided where previous systems to accomplish the same results were entirely too heavy and bulky for airborne applications.

We claim:

1. A boost surge power supply system for a high power transmitting final power amplifier tube the said tube having a collector electrode connection, a body electrode connection, a cathode electrode connection, a nominal operating voltage potential between the said anode connection and said cathode connection, and a nominal operating voltage potential between the said cathode connection and the said body connection, the said boost surge power supply comprising:

a. a floating direct current high voltage source having a relative positive potential connected to the said collector connection of the final power amplifier tube and a relative negative potential connected to the said cathode connection of the final power amplifier tube; the said high voltage being the said nominal operating voltage potential between these electrodes;
   b. a body capacitor having a determined capacitance and a resistance connected in parallel with the said body capacitor providing RC time constant;
   c. a boost power supply including a storage capacitor, the said storage capacitor having a capacitance at least ten times the capacitance of the said body capacitor, and the said boost power supply and said storage capacitor providing a larger RC recharge time constant than the said determined RC time constant of the said body capacitor and parallel connected resistance;
   d. means for connecting the said body capacitor and the said storage capacitor in series relationship between the said cathode electrode connection and the said body electrode connection of the final power amplifier tube;
   e. means for sensing the voltage potential between the said body electrode connection and the said cathode electrode connection of the final power amplifier tube and providing a control signal;
   f. a surge pass tube having at least a cathode, a grid, and a plate electrode and a hold-off voltage capability at least one-third the magnitude of the said nominal operating voltage potential between the said cathode connection and the said body connection;
   g. means for connecting the said plate electrode of the said surge pass tube to the positive potential of the said high voltage source;
   h. means including an amplifier for connecting the said control signal to the grid of the said surge pass tube; and
   i. means for connecting the said cathode of the surge pass tube and the said body capacitor to provide a series relationship of the said surge pass tube and the said body capacitor across the said high voltage source.

* * * * *

UNITED STATES PATENT OFFICE
CERTIFICATE OF CORRECTION

Patent No. 3,848,197          Dated November 12, 1974

Inventor(s) Bruce Boyd, Peter G. Espersen, and Lewis S. Heyser, Sr.

It is certified that error appears in the above-identified patent and that said Letters Patent are hereby corrected as shown below:

Col. 4, line 12, change "0.2 µ7" to -- 0.2 µf --; after "storage" insert -- capacitor --; change "4.0 µ" to -- 4.0 µf --. Col. 5, line 8, change "dropp" to -- droop --.

Signed and sealed this 24th day of June 1975.

(SEAL)
Attest:

RUTH C. MASON
Attesting Officer

C. MARSHALL DANN
Commissioner of Patents
and Trademarks